Patented Oct. 12, 1926.

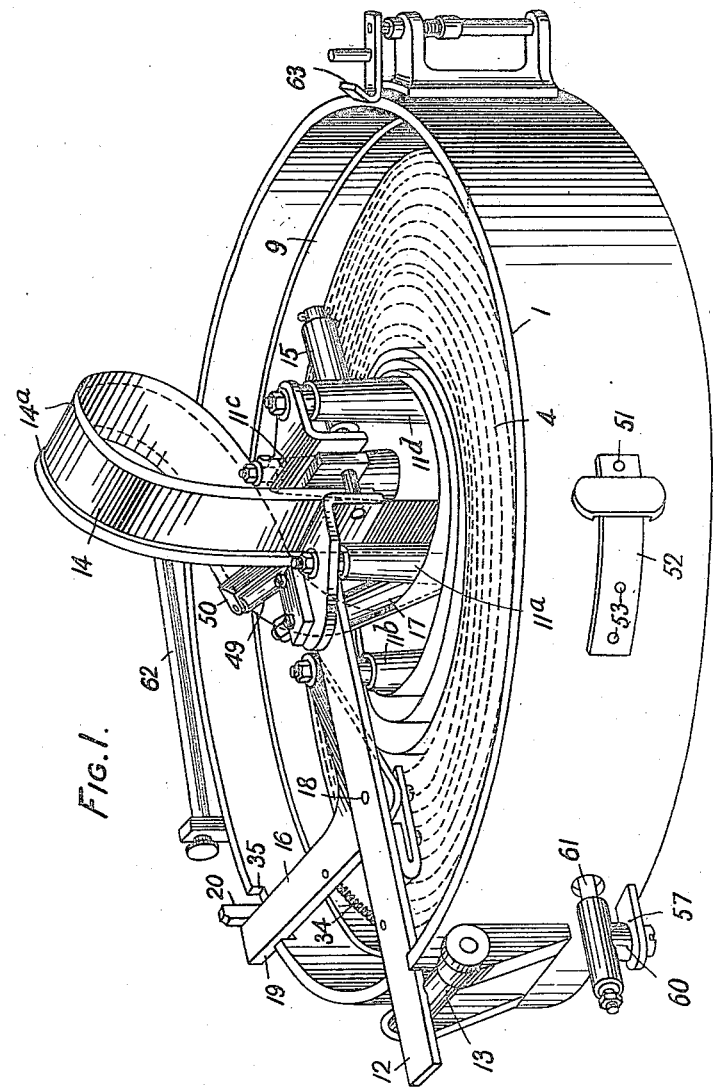

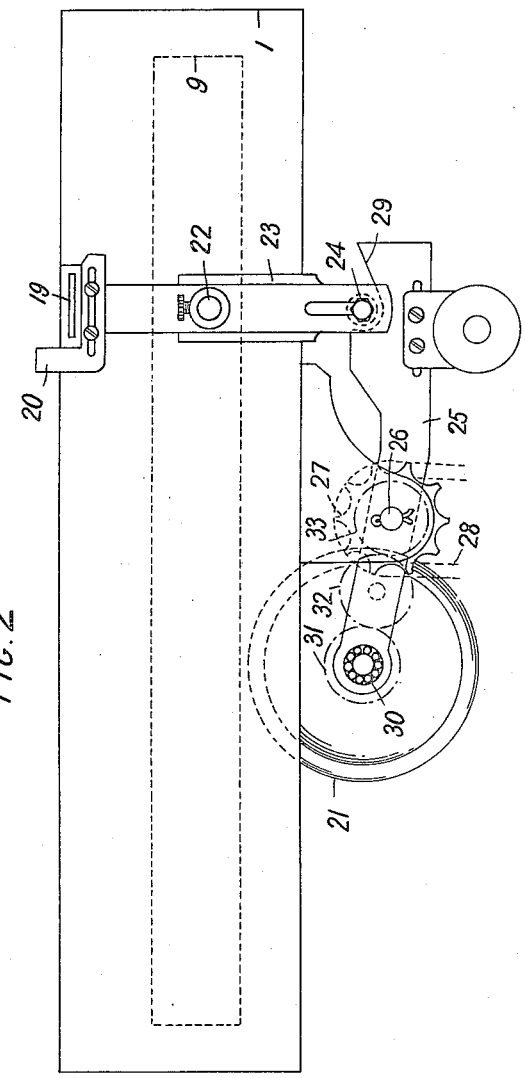

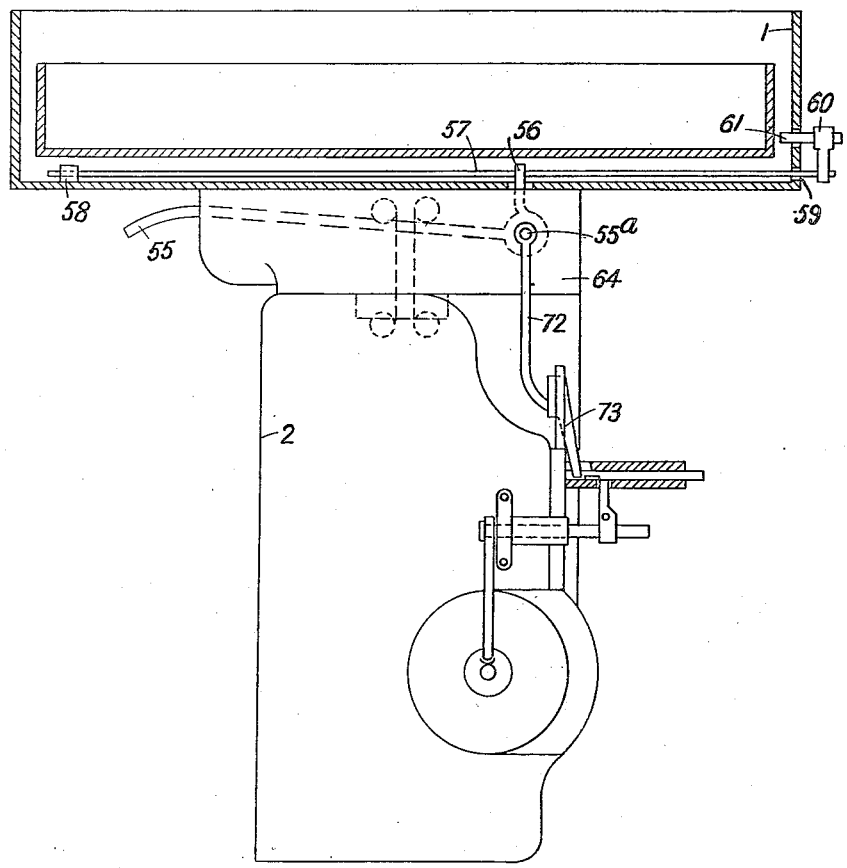

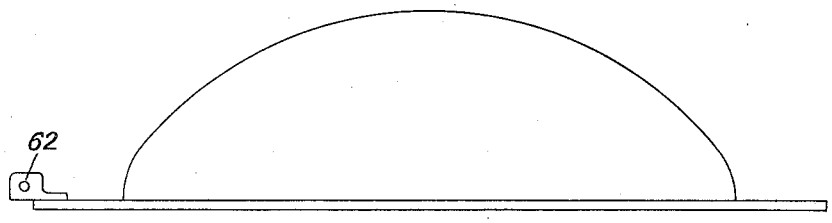
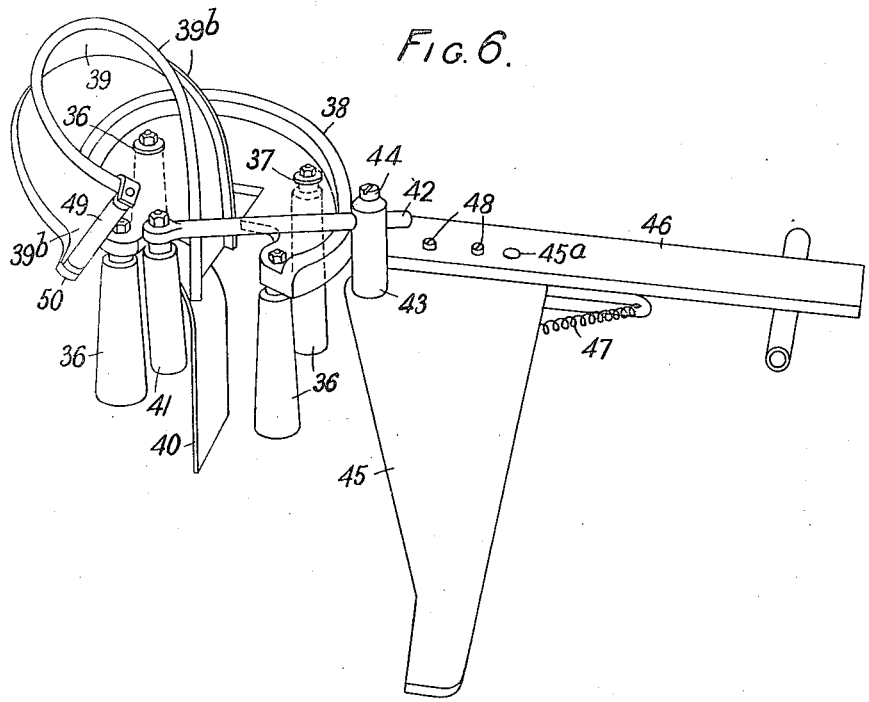

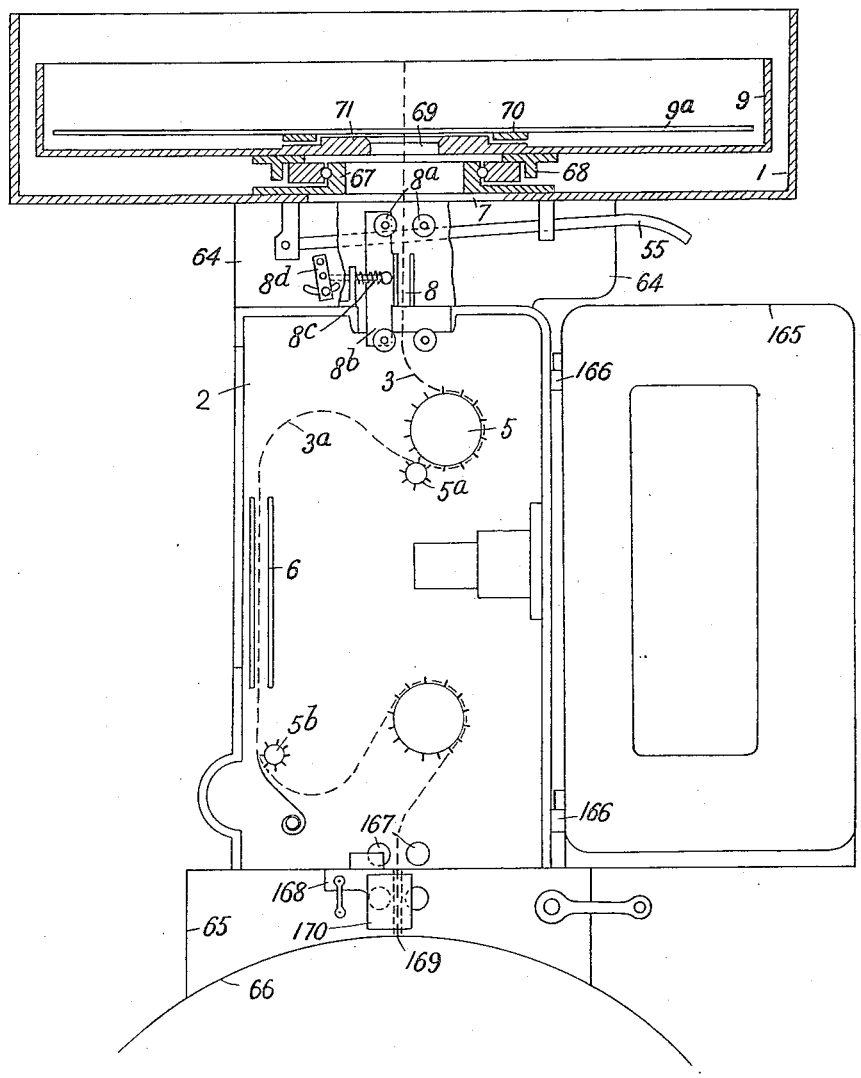

1,602,905

UNITED STATES PATENT OFFICE.

LEO KAMM, OF LONDON, ENGLAND.

FILM-FEEDING DEVICE FOR CINEMATOGRAPH APPARATUS.

Application filed January 15, 1925, Serial No. 2,653, and in Great Britain January 19, 1924.

The invention relates to film feeding arrangements for cinematograph apparatus.

The present invention comprises means and apparatus associated with the supply spool box by which a supply feed of film is in every respect as satisfactory as the normal method. This, coupled with the fact that it avoids the necessity of rewinding, is a real asset, especially when it is remembered that the rewindings normally necessary for a moderate sized picture palace may very well total 900 per week.

The present invention comprises means and apparatus appertaining to or associated with the supply box wherein are found the following features in combination:—

(a) An open tray or support on which the film spool is supported, which is rotatably mounted in the supply box with a minimum of friction (e. g. on ball or roller bearings):

(b) The tray or support and the bottom of the spool box have central coaxial apertures:

(c) A centre fitting positioned within the core of the spool adapted to limit the inward contraction of the core and preferably without frictional contact with the film.

(d) An anti-frictional film guide-way member starting obliquely upwardly near said core contracting limiting means gradually turning over and extending downwardly and axially through said supply box, film spool supporting tray and film spool.

The centre fitting may comprise a series of rollers (preferably four) disposed symmetrically within the core of the film and over which the film passes. An additional roller may be added sloping obliquely within the circle through the symmetrical rollers and disposed so as to guide the film into the spiral channel.

The roller and guideway are preferably mounted on a frame-work so that the parts can be readily positioned within the core of the film and they may be mounted on an arm hinged to the top of the supply box, as will be more clearly described hereafter.

A further feature of the invention, particularly serviceable for long spools, comprises the provision of means for avoiding any tightening of the film on the rollers, any tendency to which will be due to the film being drawn through the projector quicker than it is paid out by the rotation of the film tray in the supply box. Provision, however, may be made whereby any such tendency of the film to tighten will automatically bring into operation means for speeding up the rotation of the tray to a sufficient extent to restore the film core to normal size and thereby providing a steady film supply without undue strain on the film.

For this compensating action one of the above-mentioned rollers over which the film passes may be adjustably mounted and control the movement of a retractable friction drive in such a way that the latter will engage some part of the periphery of the tray and speed it up whenever the film tends to tighten on the adjustable roller.

To prevent too free a rotation of the film tray a permanent and resilient friction brake may be provided for the tray which friction may be increased if necessary at any time by hand to stop the tray.

Means may also be provided to stop the rotation of the film tray automatically should the action of the film be stopped for stationary projection, as by means of mechanism described in the specification of my application for British patent Serial No. 513/1924.

The invention also comprises other subsidiary features which will be described hereafter in describing constructions of apparatus according to the invention with reference to the accompanying drawings in which:

Fig. 1 shows a perspective view of the supply box, without lid.

Fig. 2 illustrates compensating mechanism for speeding up the rotation of the film tray.

Fig. 3 illustrates a braking action which may be used to stop the rotation of the film tray if the film is stopped, and the connection with the film stopping mechanism.

Fig. 4 illustrates a domed lid for the supply spool box.

Fig. 5 illustrates the supply spool box, its mounting and the film-supporting arrangements also diagrammatically the film channel to, and the film path through the projector.

Fig. 6 illustrates a modified construction for a central fitting.

The cylindrical supply spool box 1, Fig. 5, is mounted horizontally on a block or casing 64 which forms the top of the projector housing 2. The side door 165 of the housing is hinged at the front of the housing on hinges 166. The film 3 is drawn from the centre of the film spool 4, Fig. 1, by the usual sprocket wheel 5, Fig. 5, which is continuously rotated from the driving mechanism. The intermittent feed sprocket is indicated at 5b. There is also the usual pivoting roller 5a keeping the film in engagement with the sprocket 5 and the usual loop 3a between the sprocket 5 and the film gate 6.

The lid of the supply box 1 is hinged at 62, Fig. 1, and the rim of the lid at the opposite side is engaged by a spring latch 63 to hold it on the upper edge of the box 1. The centre portion of the lid may be domed as illustrated in Fig. 4, so as to fit over the spiral guide 14. Fig. 1, and central fitting hereafter described which is positioned within the core of the film spool. The outer brim of the lid is flat and rests on the edge of the supply box.

The supply box 1, Fig. 5 has a central aperture 7 fitting over a communicating channel 8 in the hollow block or casing 64. This channel is determined by upper and lower flanged rollers 8a.

Two of the rollers are mounted on a fixed frame in the casing 64 and the other two are mounted on a resilient frame 8b, which can be retracted against the action of the spring 8c by a movable fitting 8d on the outside of the casing 64.

As far as the details of the housing 2, the sprockets, gates and intermittent mechanism are concerned, they may be of ordinary construction. The housing 2 together with the lantern casing may be supported directly by a hollow block or casing 65 on top of the take-up spool box 66. The latter may be mounted between gripping jaws on uprights not shown in the drawings.

The lower block or casing 65 may be fitted with guide rollers 167 similar to the rollers 8a on the block or casing 64. The casing is formed with a slit in the plane of the film channel, extending to the front face of the casing, and downwardly to the take-up spool box 66. A sliding plate is moved with the movable frame 168 to uncover the slit for inserting the film edgewise through the slit into the channel, and automatically recovers the slit when the frame 168 is released.

Within the supply box 1 and coaxial with the opening 7 is an antifriction ball race or roller bearing fitting 67. The film tray or drum 9 rotates on this bearing 67 and is held in position by a circular flange 68. The bottom of the tray 9 has a central circular opening 69. The film may be supported directly by the tray or drum 9, but is preferably supported on the flat surface of a plate 9a which is positioned on the tray 9 by circular flanges 10, 71 on the plate and tray respectively.

The core of the film must be sufficiently large to allow the film to unwind from the centre and pass in a spiral path upwards inwards, and downwards through the centre. It must also be wide enough to house a central fitting limiting the contraction of the core and hereinafter to be described.

To take full advantage of the system and apparatus, the film is preferably wound on a split take-up spool which has a core of a size corresponding to the periphery of the central fitting referred to. A split spool is advantageously employed in which the whole width of the core is on one face the other face 9a being detachable and substantially flat so that the wound up film may be inserted on the take-up spool with the flat face on the tray or drum 9 and the core and top face detached and removed leaving the film with an open core resting on the flat face 9a of the split spool on the bottom of the tray or drum 9.

A spool of service for the purpose may be of any well known construction.

The central fitting adapted to be placed in the open core of the spool comprises a series of four vertical rollers 11a, 11b, 11c, 11d, Fig. 1, symmetrically mounted relatively to the aperture 7 and the corresponding central opening 69 in the tray 9.

These rollers 11 are mounted on a support or bar 12 fitted on the top of the supply box, as by a hinge 13 so that the rollers can be raised and lowered from and into the core of the spool. A fifth oblique roller 17 is also mounted on the bar or support 12 within the circle of the symmetrical rollers 11.

A spiral shaped film channel guide 14 is also mounted on the support or bar 12. One end of this guide is mounted adjacent to the oblique roller 17 and is spaced therefrom and angularly situated so that the film will pass in an easy path from the outside of the four vertical rollers, between one of them, (for example 11b) and the oblique roller 17. passing over the surface of this latter, and thence easily into the channel guide 14. The position and configuration of the guide, and the obliquity and position of the roller 17 are adjusted for this purpose. To facilitate the passage of the film into the entrance of the spiral guide a roller 49 may be fitted on a bracket 50.

The other end of the guide channel 14 passes centrally downwards towards the centre of the opening 7 in the spool box.

The rollers 11 and 17 are advantageously mounted on ball bearings and preferably the rollers 11 are also slightly tapered towards the upper ends. This latter feature is designed to prevent the film rising on the rollers and keep it on the tray.

The spiral channel is formed with turned-over edges 14a and is highly polished on the inner surface over which the celluloid surface of the ordinary film will normally pass.

The structural build of the central fitting is preferably in sections so that the rollers and guide channel can be easily dismantled and parts replaced; the sectional parts and mountings may be of any stamped materials and formation suitable for the purpose.

If desired an additional horizontal roller 15 may be mounted on the central fitting so as to be normally situated just above the upper plane of the film spool and it may likewise be mounted on ball bearings. Alternatively a bar extending to and resting on the opposite edge of the spool box may be used.

In order to prevent any tendency of the core to tighten on the rollers 11 means may be provided to temporarily speed up the rotation of the film tray 9. To this end the roller 11$^b$ is mounted on one end of an angle arm 16 which is pivoted at 18 on the supporting arm 12. The outer end 19 of the arm 16 projects through a slot 35 in the edge of the supply box and abuts against a lever 20. This lever 20 controls the action of a friction wheel 21, Fig. 2, which projects through a slot in the base of the spool box 1 can be brought into contact with the drum or tray 9 to speed it up as occasion arises.

The lever 20 is pivoted at 22 on a bracket 23, and carries at its lower end a roller 24. This roller 24 engages a cam surface 29 at one end of a lever arm 25. This lever arm 25 pivots on the framework of the machine at 26. Coaxial with this pivot 26 is a gear 27, as for example sprocket wheel, which is driven by the projector driving mechanism as by a chain 28. The friction wheel 21 is mounted at the end of the lever 25 opposite the cam surface 29, preferably on a ball race 30, and is continuously driven from the shaft 26, by gears 31, 32, 33 all mounted in the lever 25.

The action of this mechanism will be apparent. If the film tends to tighten around the rollers 11, the roller 11$^b$ will yield somewhat, the lever 16 will rock the lever 20 and the lever 20 will rock the lever 25 through the roller 24 and cam surface 29, thereby bringing the friction roller 21 into engagement with the tray 9 and speeding it up. When the tension on the film around the rollers 11 is normal again, the roller 11$^b$ will tend to move outwards partly by reason of the weight of the friction wheel 21 acting through the levers 25 and 20 and partly by reason of a light spring 34 anchored between the lever 16 and arm 12. The angular movement of the lever 16 is limited by the slot 35 in the periphery of the spool box 1 through which it extends, and the possible movement of the arm 16 need only be very limited as a very slight movement of the roller 11$^b$ is sufficient to cause the necessary speeding up or a retraction of the friction disc when conditions become normal.

In a modified construction for the centre fitting illustrated in Fig. 6, the four depending and slightly tapering rollers 36 are mounted on ball bearings on fixed vertical spindles secured, as by screw nuts 37, to a gapped circular plate 38. The rigid spiral guide 39 is also attached to the centre part of the plate 38. The rigid spiral guide 39 is also attached to the centre part of the plate 38. A flat strip 40 depending through the supply box to the guide rollers 8$^a$, Fig. 5, is also attached to the plate 38. In this modification, the oblique roller 41 guiding the film in turning upwards from one of the rollers 36 is adjustably mounted at the end of a horizontal rod 42 secured to a pillar 43 by a screw 44. This mounting enables the obliquity of the roller 41 to be adjusted and also its proximity to the mouth 39$^a$ of the spiral guide 39. The pillar 44 is mounted on a flat plate 45, the angular setting of the pillar 43 offering a further adjustment for positioning the oblique roller 41. The plate 45 is pivoted at 45$^a$ on a transverse bar 46 to which the centre plate 38 and central fitting is attached as by screws or bolts.

The bar 46 corresponding to the bar 12 of the former construction of Fig. 1 may be hinged to or otherwise mounted on to the spool box, so that the plate 38 and associated parts are correctly positioned at the centre of the supply box. For example, a similar bar, (not shown) may be attached at the opposite side of the plate 38 and rest in a recess on the top edge of the supply box. The plate 45, corresponding to the lever 16 of Fig. 1, extends through a recess such as 35 in Fig. 1 and is adapted to function in the same manner but under the control of the oblique roller 41 instead of the vertical rollers.

The plate 45 is under the influence of a light spring 47 tending to keep the oblique roller 41 in the normal position and the accelerating mechanism out of action. It has slots engaged by pins or screws 48 projecting from the under side of the bar 46 whereby the angular movement of the plate 45 on the bar 46 is limited.

To facilitate the entry and feed of the film at the end 39$^a$ of the film guide 39 the turned over edges 39$^b$ are curved outwards slightly and a roller 49 is mounted on a bracket 50 fitted at the end of the guide.

A permanently acting light friction brake acting on the film tray or drum 9 is constituted by a fibre stud 51, Fig. 1, projecting inwardly through a hole in the side of the supply box, the stud being mounted on a light springy plate 52, secured at 53 to the supply box.

The film tray or drum 9 can be arrested at any time by pressing on the fibre stud 51 of the spring plate 52.

In order that the film tray or drum may be arrested automatically if at any time the film is stopped for stationary projection, the operating lever by which the film feed mechanism is stopped is operatively connected with a brake which is applied to stop the tray or drum 9 when the film stopping lever is actuated.

In the construction shown in Fig. 3, the stopping lever 55, is mounted on a transverse shaft 55ª extending through the casing 64. This shaft 55ª also carries an arm 56 within the casing which projects through the base of the supply box 1. The arm 56 engages and slides a horizontal bar 57 slidably mounted on a support 58 or supports in the supply box and projecting through the side of the box at 59. This arm carries a bracket 60 on which a film stud 61 is fitted which projects within the box 1 and engages the periphery of the film tray or drum 9.

At the end of the transverse shaft 55ª and outside the casing 64 is mounted a depending arm 72 which contacts with and actuates a lever pivoted on the projector casing 2. This lever 73 actuates the film stopping mechanism described in the specification of my application for British Patent No. 513/1925 when the lever 55 is operated and the operation of the lever 55 also applies the brake 61 on the drum 9.

I claim:—

1. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, frictionless core contraction limiting means mounted within the core of the spool and an anti-frictional film guide-way member starting obliquely upwardly near said core contraction limiting means gradually turning over and extending downwardly and axially through said supply box, film spool supporting tray and film spool.

2. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a plurality of core contraction limiting rollers disposed symmetrically within the core of the spool, and an anti-frictional film guide-way member starting obliquely upwardly near said core contraction limiting means gradually turning over and extending downwardly and axially through said supply box, film spool supporting tray and film spool.

3. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a plurality of core contraction limiting rollers disposed symmetrically within the core of the spool and an additional film guiding roller sloping obliquely within the circle through said core contraction limiting rollers adjacent to one end of said spiral guide-way and an anti-frictional film guide-way member starting obliquely upwardly near said core contraction limiting means gradually turning over and extending downwardly and axially of said supply box, film spool supporting tray and film spool.

4. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, frictionless core contraction limiting means mounted on said movable support within the core of the spool, and an anti-frictional film guide-way member mounted on said movable support starting obliquely upwardly near said core contraction limiting means gradually turning over and extending downwardly and axially through said supply box, film spool supporting tray and film spool.

5. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, four core contraction limiting rollers disposed symmetrically within the core of the spool and mounted on said movable support, an additional guiding roller sloping obliquely within the circle through said core contracting limiting rollers adjacent to one end of said spiral guide-way and mounted on said movable support, and an anti-frictional film guide-way member mounted on said movable support, starting obliquely upwardly near said core contraction limiting means gradually turning over and extending downwardly and axially of said supply box, film spools supporting tray and film spool.

6. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a plurality of upwardly tapered core contraction limiting rollers disposed symmetrically within the core of the spool, and an anti-frictional film guide-way member starting obliquely upwardly near said core contraction limiting means gradually turning over and extending downwardly and axially of said supply box, film spool supporting tray and film spool.

7. A film feeding device for cinematograph apparatus comprising a film spool supply box having a central aperture, an open film spool supporting tray rotatably and anti-frictionally mounted within said film spool supply box, and provided with a central aperture coaxial with the aforesaid aperture in said supply box, a plurality of upwardly tapered core contraction limiting rollers disposed symmetrically within the core of the spool, an additional roller sloping obliquely within the circle through said upwardly tapered core contraction limiting rollers adjacent to one end of said guide-way member, and an anti-frictional film guide-way member starting obliquely upwardly near said core contraction limiting means gradually turning over and extending downwardly and axially of said supply box, film spool supporting tray and film spool.

8. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, four upwardly tapered core contraction limiting rollers disposed symmetrically within the core of the spool, and mounted on said movable support, an additional guiding roller sloping obliquely within the circle through said upwardly tapered core contracting limiting rollers adjacent to one end of said guide-way member and mounted on said movable support, and an anti-frictional film guide-way member mounted on said movable support starting obliquely upwardly near said core contraction limiting means gradually turning over and extending downwardly and axially of said supply box, film spool supporting tray and film spool.

9. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, a spiral antifrictional guide-way member mounted on said movable support and extending at one end axially of said supply box, film spool supporting tray and film spool, the other end sloping obliquely towards the inner convolutions of the film spool, four core contraction limiting rollers, means disposed symmetrically within the core of the spool and mounted on ball bearings on said movable support, and an additional guiding roller mounted on ball bearings sloping obliquely within said core contracting limiting rollers adjacent to one end of said spiral guide-way and mounted on said movable support.

10. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a support hinged to said supply box, frictionless core contraction limiting means mounted on said hinged support within the core of the spool, and an antifrictional guideway member mounted on said hinged support starting obliquely upwardly near said core contraction limiting means gradually turning over and extending downwardly and axially of said supply box, film spool supporting tray and film spool.

11. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a spiral antifrictional guide-way member extending at one end axially of said supply box, film spool supporting tray and film spool, the other end sloping obliquely towards the inner convolutions of the film spool, and frictionless core contraction limiting means mounted within the core of the spool, and means operatable by the film for speeding up the rotation of said spool supporting tray.

12. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, a spiral antifrictional guide-way member mounted in said movable support and extending at one end axially of said supply box, film spool supporting tray and film spool, the other end sloping obliquely towards the inner convolutions of the film spool, and frictionless core contraction limiting means mounted on said movable support within the core of the spool, and means operatable by the film for speeding up the rotation of said spool supporting tray.

13. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, a spiral antifrictional guide-way member mounted on said support and extending at one end axially of said supply box, film spool supporting tray and film spool, the other end sloping obliquely towards the inner convolutions of the film spool, a plurality of core contraction limiting rollers disposed symmetrically within the core of the spool, and an additional roller sloping obliquely within the circle through said core contraction limiting rollers adjacent to one end of said spiral guide-way, one of said rollers being mounted on one end of an arm pivoted on said support, the outer end of said arm operating means controlling a film operated friction wheel adapted to rotate the spool supporting tray.

14. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a movable support on said supply box, a spiral antifrictional guide-way member mounted on said support and extending at one end axially of said supply box, film spool supporting tray and film spool, the other end sloping obliquely towards the inner convolutions of the film spool, a plurality of core contraction limiting rollers disposed symmetrically within the core of the spool, and an additional roller sloping obliquely within the circle through said core contraction limiting rollers adjacent to one end of said spiral guide-way, one of said core contraction limiting rollers being mounted at one end of an angle arm pivoted at its bend on said support, the outer end of said angle arm projecting through the supply box and abutting against a pivoted lever carrying at its lower end a roller engaging a cam surface at one end of a rocking lever arm pivoting around a spindle of a sprocket driven by the film driving mechanism, said rocking lever carrying at its other end a friction wheel adapted to rotate the spool supporting tray, said friction wheel being continuously driven from said spindle by gear wheels mounted upon said rocking lever.

15. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box a movable support on said supply box, a spiral antifrictional guide-way member mounted on said support and extending at one end axially of said supply box, film spool supporting tray and film spool the other end sloping obliquely towards the inner convolutions of the film spool, a plurality of core contraction limiting tapered rollers mounted on ball bearings disposed symmetrically within the core of the spool, and an additional roller within the circle through said core contraction limiting rollers adjacent to one end of said spiral guide-way, said obliquely sloping roller being mounted at one end of an angle lever formation pivoted on said support, the outer end of said angle arm projecting through the supply box and abutting against a pivoted lever carrying at its lower end a roller engaging a cam surface at one end of a rocking lever arm pivoting around a spindle of a sprocket driven by the film driving mechanism, said rocking lever carrying at its other end a friction wheel adapted to rotate the spool supporting tray, said friction wheel being continuously driven from said spindle by gear wheels mounted upon said rocking lever.

16. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, frictionless core contraction limiting means mounted within the core of the spool, a light resilient brake permanently acting on said film spool supporting tray, and an antifrictional film guide-way member starting obliquely upwardly near said core contraction limiting means gradually turning over and extending downwardly and axially of said supply box, film spool supporting tray and film spool.

17. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a spiral antifrictional guide-way extending at one end axially of said supply box, film spool supporting tray and film spool, the other end sloping obliquely towards the inner convolutions of the film spool, frictionless core contraction limiting means mounted within the core of the spool, and hand operated means simultaneously braking the film spool supporting tray and stopping the film driving mechanism.

18. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a spiral antifrictional guide-way member extending at one end axially of said supply box, film spool supporting tray and film spool, the other end sloping obliquely towards the inner convolutions of the film spool, and frictionless core contraction limiting means mounted within the core of the spool, said supply box being horizontally mounted on and integral with a casing containing cooperating film guide rollers.

19. A film feeding device for cinematograph apparatus comprising a film spool supply box having a central aperture, an open film spool supporting tray rotatably and antifrictionally mounted within said film spool supply box, and provided with a central aperture coaxial with the aforesaid aperture in said supply box, a spiral antifrictional guide-way member extending at one end axially of said supply box, film spool supporting tray and film spool, the other end sloping obliquely towards the inner convolutions of the film spool, and frictionless core contraction limiting means mounted within the core of the spool, a casing integral with the lower surface of said supply box, a pair of fixed film guide rollers mounted in said casing and a pair of resiliently mounted co-operating guide rollers also mounted within said casing.

In testimony whereof, I affix my signature.

LEO KAMM.